3,107,633
SPEED CONTROL APPARATUS FOR WHEELED VEHICLES
David E. Bick, Cheltenham, England, assignor to Dowty Hydraulic Units Limited, Tewkesbury, Gloucester, England, a British company
Filed Apr. 30, 1962, Ser. No. 191,176
Claims priority, application Great Britain May 1, 1961
7 Claims. (Cl. 104—162)

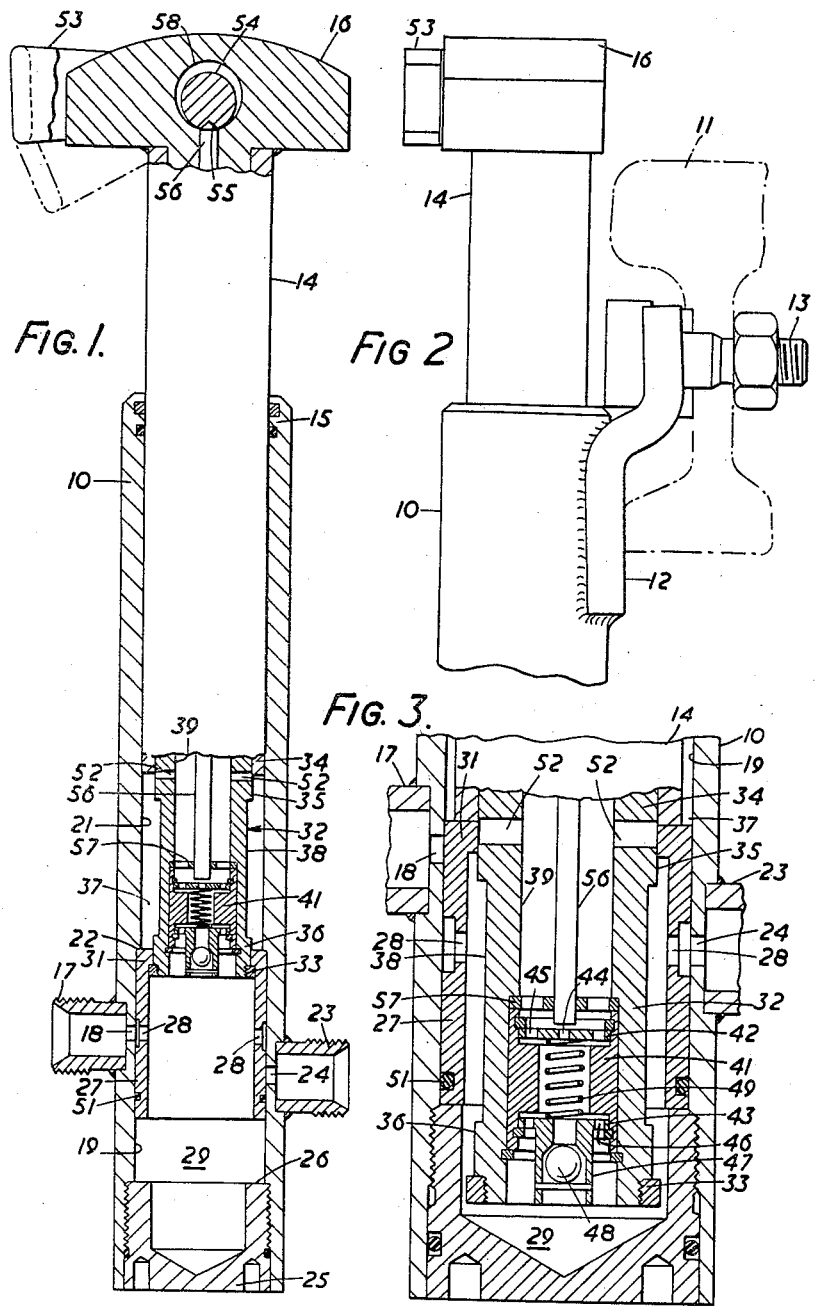

This invention relates to apparatus which is mounted adjacent a railway track to control the speed of free running vehicles.

In the specification of patent to P. E. Checkley and myself, No. 3,040,676, dated June 26, 1962, there is described a speed control device comprising a liquid-filled piston and cylinder unit arranged to act in contraction and extension against the periphery of a vehicle wheel rolling along a track rail, under the application of high or low liquid pressure from external sources, the connection of which to the unit is controlled automatically during contraction and extension by a valve device operating in response to a signal of vehicle speed, whereby vehicles moving faster than a predetermined critical speed are retarded and vehicles moving slower than the critical speed are accelerated by the action of high liquid pressure.

Such speed control devices may be used in hump marshalling yards in which the speed of vehicles down an incline may vary considerably, depending for example upon whether they are heavily or lightly loaded. A number of such devices are fixed in succession at suitable positions along a siding with the object of preventing vehicles from jostling one another violently on their way to an assembly point, and to provide close grouping of vehicles at the assembly point by ensuring that they all approach this point at substantially the same low speed.

If the speed control apparatus operates to slow down fast moving vehicles and accelerate slow moving vehicles towards a single critical speed, then a vehicle which approaches a succession of speed control devices substantially at the critical speed will be alternately accelerated and retarded with consequent waste of fluid power.

The improved speed control apparatus for free running railway vehicles, according to the present invention, comprises a liquid-filled telescopic unit arranged to act against the periphery of a vehicle wheel rolling along a track rail, low and high pressure valve ports arranged for connection with sources of low and high liquid pressure respectively, valve means co-operable with the low and high pressure ports to connect one or the other port with the liquid-filled interior of the telescopic unit, and valve-controlling devices responsive to telescopic movement of the unit and to vehicle speeds of upper and lower critical values, the controlling action of said devices upon the valve means being co-ordinated whereby the high liquid pressure source resists contraction of the telescopic unit by a vehicle wheel moving above the upper critical speed and causes extension of the telescopic unit against a vehicle wheel moving below the lower critical speed, and whereby the telescopic unit is connected to the same pressure port during contraction and extension when the vehicle wheel moves between the upper and lower critical speeds.

By means of the present invention therefore, fast moving vehicles are retarded, slow moving vehicles are accelerated, while over an intermediate speed range vehicles are neither retarded nor accelerated.

One form of unit for acceleration and retarding is shown in the accompanying drawings of which;

FIGURE 1 is a partly sectional view looking in the direction perpendicular to a track rail against which the unit is mounted, though not shown the rail and the mounting of the unit thereon;

FIGURE 2 is an elevation of the upper part of the unit looking in the direction along the rail and showing the mounting of the unit thereon, and FIGURE 3 is an enlarged sectional view of the lower part of the unit at a different stage of operation from that shown in FIGURE 1.

The unit comprises a cylinder 10 arranged for vertical mounting against a fixed rail 11 on the inside of the track by means of a bracket 12 and a bolt 13. A plunger 14 slidable in the cylinder 10 emerges through a packing device 15 while its upper end carries a head 16 which lies adjacent the rail 11 and normally above it in a position to be engaged and depressed by the flange of a wheel rolling along the fixed rail 11. The lower portion of the cylinder 10 has a low pressure connector 17 attached thereto and leading through a low pressure port 18 into a counter-bore 19 in the lower part of the cylinder 10. This counter-bore is of slightly larger diameter than the bore 21 in which the plunger 14 slides and the bore and counter-bore are separated by a step 22. A high pressure connector 23 attached to the cylinder 10 leads through a pressure port 24 into the counter-bore 19 at a position axially spaced from the low pressure port 18. The lower end of the cylinder 10 is closed by a plug 25 and the inner end of the plug forms a bottom limit stop 26 for a slide valve 27 which is mounted in the counter-bore 19, the step 22 forming an upper limit stop for the slide valve 27.

The slide valve has ports 28 which in the raised position of the slide valve 27, against the step 22 (FIGURE 1) connect the chamber 29 formed within the counter-bore 19 with the low pressure port 18, while in the lower position of the slide valve 27 against the limit stop 26, see FIGURE 3, the ports 28 therein connect with the high pressure port 24. The upper end of the slide valve 27 has an inturned flange 31. A stem 32 fixed in the lower part of the plunger 14 extends downwardly through the flange 31 and has a retaining ring 33 fixed to its lower end. When the plunger 14 travels downwardly slowly, the lower end 34 of the plunger will engage the flange 31 towards the end of the stroke and push the slide valve 27 to its lower position where the chamber 29 is connected with the high pressure port 24 as described. Towards the end of the ensuing upward stroke of the plunger 14, the retaining ring 33 engages under the flange 31 and lifts the slide valve 27 to its upper limit position against the step 22 so that the chamber 29 is connected with the low pressure port 18. Thus if a vehicle is moving slowly along the rail, that is below a certain critical speed, the flange of the wheel will depress the head 16 of the plunger 14 so that through the greater part of the downward stroke liquid is merely expelled from the unit through the low pressure port 18 thus affording substantially no resistance, but near the end of the downward stroke, the lower end 34 of the plunger 14 pushes the slide valve 27 downwards so that the valve ports 28 lie in register with the high pressure port 27 for the ensuing upward stroke of the plunger 14. This upward stroke commences as the wheel axis passes just over the axis of the plunger 14 and the high pressure supply at the connector 23 then acts upwardly on the plunger 14 to apply an accelerating force on the vehicle wheel.

The stem 32 incorporates valve mechanism for effecting retardation of a vehicle moving at higher speeds and this mechanism will now be described.

The upper and lower parts of the stem 32 are formed as cylindrical steps or lands 35 and 36 whose external diameter is substantially that of the interior diameter of the flange 31 so that during the first part of the downward stroke the lower step 36 is a sliding fit within the flange 31 while during the first part of the stroke of the plunger 14, the upper step 35 is a sliding fit within the flange 31. This sliding fit, in either case, substantially closes the chamber 29 within and below the slide valve 27 from the annular chamber 37 which lies above it between the stem 32 and cylinder bore 21. The cylindrical surface of the stem 32 between the steps 35 and 36 forms the base of an elongated recess 38. When the base of the recess 38 lies opposite the flange 31, liquid can pass freely between the chamber 29 and 37.

The stem 32 has a central bore 39 in its lower part, as best shown in FIGURE 3, wherein valve mechanism is provided. This valve mechanism comprises a fixed valve seat member 41 engageable by an upper clack valve 42, and a lower clack valve 43. The upper clack valve 42 is a disc having a central orifice 44 which remains open and an outer row of orifices 45 which are closed by the valve seat member 41 when the clack valve 42 is depressed. The lower clack valve 43 comprises a flange having an outer row of orifices 46 which are also closed by the seat member 41 when the lower clack valve 43 is raised, but the central part of the lower clack valve 43 comprises a hollow spigot 47 housing a non-return valve 48. This non-return valve closes under upward flow of liquid from the chamber 29, but opens under downward flow of liquid into the chamber 29. A spring 49 interposed between the clack valves 42 and 43 normally maintains both clack valves off their seats, but the load of the spring 49 in conjunction with the sizes of the orifices in the clack valves 42 and 43 is chosen so that the upper clack valve 42 will close at a critical rate of downward flow of liquid while the lower clack valve 43 will close under a different upward critical flow of liquid. The slide valve 27 has a friction ring 51 recessed therein to bear against the counter-bore 19. This friction ring will retain the slide valve 27 in either end position in the counter-bore 19 so long as both clack valves 42 and 43 are open, but if either clack valve is closed the pressure differential thereby developed across the annular cross-sectional area of the flange 31 will displace the slide valve 27 downwardly or upwardly according to the direction in which the pressure differential acts. The central bore 39 in the stem 32 opens outwardly into the cylinder bore 21 through radial passages 52 adjacent the inner end 34 of the plunger 14.

The manner in which the valve mechanism operates will now be described. It will be shown that a vehicle travelling at a speed equal to or greater than a "first critical speed" is retarded. Below a "second critical speed" which is less than the "first critical speed," a vehicle is accelerated. Between the two critical speeds the speed of a vehicle is substantially unchanged by the speed control unit.

If the head 16 of the unit is engaged by the wheel of a vehicle travelling at a speed equal to or greater than the "first critical speed," depression of the plunger 14 causes liquid to be discharged from the annular chamber 37, through the passages 52 and the central bore 39, the orifices 44 and 45 in the upper clack valve 42, the orifices 46 in the lower clack valve 43, and non-return valve 48, into the lower chamber 29, and thence through the valve ports 28 into the low pressure port 18. Little or no appreciable flow of liquid passes direct through the working clearance between the flange 31 and the lower step 36 on the stem 32. The flow rate through the orifices 44 and 45 causes a pressure difference across the clack valve 42, which overcomes the load of the spring 49 so that the clack valve closes against the seat member 41 whereby the row of orifices 45 is closed. The increased pressure thereby developed across the clack valve 42 also acts upon the annular cross-sectional area of the flange 31 with sufficient force to overcome the friction of the ring 51 and displace the slide valve 27 downwardly during the initial part of the downward stroke of the plunger 14. The chamber 29 is thereby connected through the ports 28 and 24 with high pressure connection 23. The larger part of the downward stroke of the plunger 14 then takes place against the back pressure of the high pressure source whereby a retarding force is applied to the vehicle wheel.

When the wheel axis just passes the axis of the plunger 14 so that the latter starts to rise, the upper step 35 is as shown in FIGURE 3 in sliding engagement with the flange 31 so that all liquid flow into the annular chamber 37 must take place through the valves in the hollow stem 32. The plunger 14 will have no upward velocity when the wheel lies vertically above, but the velocity will increase as the vehicle wheel rolls away. The length of the upper step 35 is chosen so that the plunger 14 has an appreciable upward velocity before the step 35 clears the flange 31 to allow free flow of liquid from the chamber 29 to take place between the flange and the base of the recess 38. If before this happens the vehicle is still travelling at or above the first critical speed, the rate of liquid flow through the clack valve 43 will rise to a value at which the clack valve 43 closes on the seat member 41 against the load of the spring 49. This causes an increased upwardly acting pressure differential on the slide valve 27 which overcomes the friction of the ring 51 and raises the latter to bring the ports 28 into register with the low pressure port 18. The plunger will then continue to rise over the greater part of its stroke with the admission of low pressure only to the chambers 29 and 37.

If the vehicle is travelling over the unit at a speed which is less than the "first critical speed," but greater than the "second critical speed," the upper clack valve 42, which operates at the second critical speed, will close as before near the beginning of the downward stroke of the plunger 14 so that there is a retarding force applied by the back pressure of the high pressure source. On the ensuing upward stroke, the lower clack valve 43 will not close because the flow rate will not rise to the critical value corresponding to the first critical speed. The slide valve 27, therefore, stays in its lower position during upward travel of the plunger 14 until the retaining ring 33 engages under the flange 31. The greater part of the upward stroke of the plunger 14 acting against the vehicle wheel, therefore, takes place under the action of fluid pressure. There is, therefore, no net retardation or acceleration of the vehicle since substantially the same energy is put back into the vehicle on the up stroke of the plunger 14 as was absorbed during the down stroke.

At vehicle speeds below the "second critical speed," the clack valve 42 will remain open on the downward stroke of the plunger 14 and the lower clack valve 43 will remain open on the upward stroke. The slide valve 27 is therefore displaced only by its lost-motion connection with the plunger 14. That is to say, the lower end 34 of the plunger 14 pushes the slide valve 27 to its lower position near the end of the down stroke while the slide valve is raised to its upper position near the end of the upward stroke of the plunger 14. This means that the chambers 37 and 29 are connected to the low pressure port 18 on the down stroke and to the high pressure port on the up stroke, so that the latter stroke applies an accelerating force to the vehicle wheel.

Mechanism is provided to ensure that any vehicle travelling in the reverse direction up the track will always be retarded whatever its velocity may be. This mechanism comprises a lever 53 which extends from a stub shaft 58 in the direction of the "down" side of the track, the stub shaft 58 being mounted to turn in a transverse bore in the head 16. The stub shaft 58 is formed with a circular cam 54 having a notch 55 which is normally engaged by an upwardly spring-loaded push rod 56. The loading spring is not seen in the drawings. The lower end of the push rod 56 extends through a guide plate 57 into proximity with the upper clack valve 42. If a vehicle is returning up the track, for example, by buffing recoil, the wheel first engages the lever 53 to turn the stub shaft 54 so that the push rod 56 is depressed by the cam 54. The push rod 56 closes the upper clack valve 42 on the seat member 41 and also the central orifice 44 so that the escape of liquid from the annular chamber 37 can only take place between the base of the recess 38 and the flange 31 after the pressure difference developed has displaced the slide valve 27 to its lower position. The down stroke of the plunger 14 caused by a vehicle moving in reverse is therefore always a retarding stroke.

I claim as my invention:

1. A combined retarder and accelerator mechanism for railway vehicles which run free along a track, to retard such a vehicle running at speeds above a defined upper critical speed, or to accelerate such a vehicle running at a speed below a defined, relatively lower, critical speed, said mechanism comprising a piston and cylinder unit enclosing a volume of liquid, means located for depression by the wheel flange of a passing vehicle, means urging said depressible means to its initial raised position, said depressible means being operatively connected to said piston and cylinder unit to contract same when depressed, low and high pressure valve ports in said piston and cylinder unit adapted for connection with sources of low and high liquid pressure respectively, valve means co-operable with the low and high pressure valve ports to connect one or the other with the volume of liquid within said unit, a valve-controlling device responsive to the direction of relative movement of said piston and cylinder, and additional valve-controlling devices responsive to rates of said relative movement which correspond to said upper and lower critical vehicle speeds respectively, the several valve-controlling devices being operatively co-ordinated and adapted to actuate said valve means whereby the high pressure port is connected to said volume of liquid substantially during contraction of the piston and cylinder unit by a vehicle wheel moving faster than the upper critical speed, the high pressure port is connected to said volume of liquid during extension of said unit against a vehicle wheel moving slower than said lower critical speed, and the same pressure port is connected to said volume of liquid substantially during contraction and extension of said unit when the speed of the vehicle wheel lies between said upper and lower critical speeds.

2. Mechanism according to claim 1, wherein the low and high pressure ports are longitudinally spaced in the cylinder for opening and closing by the valve means which is formed as a valve element slidable longitudinally in the cylinder, and wherein the valve-controlling device responsive to the direction of relative movement of the piston and cylinder comprises a lost-motion device operatively connected to the valve element to displace same in opposite directions towards the ends of the contraction and extension strokes respectively of the piston in the cylinder.

3. Mechanism according to claim 1, wherein the valve means includes a pressure actuating area operatively disposed between part at least of said volume of liquid enclosed by the piston and cylinder unit and the low and high pressure ports whereby liquid flow in accordance with contraction and extension movements of said unit takes place oppositely across said area, and wherein said additional valve-controlling devices are formed as flow-sensitive valves, one of which is operative to close under liquid flow therethrough during contraction of movement of the unit by a vehicle wheel moving above the lower critical speed, and the other of which is operative to close under liquid flow therethrough during extension movement of the unit against a vehicle wheel moving above the upper critical speed, and wherein the closing of each flow-sensitive valve is operative to develop an actuating liquid pressure across said area to effect shifting of said valve means.

4. A combined retarder and accelerator mechanism for railway vehicles which run free along a track, comprising a cylinder adapted for fixed mounting adjacent a track rail, a piston slidably mounted in the cylinder and having at its upper end a head disposed for engagement by the flange of a vehicle wheel rolling along the rail whereby the piston is reciprocable in contact with the rolling wheel, a low pressure port in said cylinder adapted for connection with a source of low liquid pressure, a high pressure port in said cylinder axially spaced therein from said low pressure port and adapted for connection with a source of high liquid pressure, an annular valve element slidable in the cylinder in alternate closing and opening relation with said low and high pressure ports, a hollow stem projecting from said piston and having axially spaced stop means co-operable with said annular valve element to shift same towards the end of each reciprocating stroke of the piston, said valve element being co-operably slidable with said hollow stem to define an annular liquid filled chamber of variable volume disposed radially between the cylinder and the stem, passage means provided by said hollow stem between the variable volume chamber and the valve-controlled low and high pressure ports, a first flow-sensitive valve disposed in said passage means and responsive to liquid flow from said annular chamber at and above a rate corresponding to inward movement of the piston in the cylinder caused by a vehicle wheel moving at and above a defined lower critical speed, said first flow-sensitive valve being thereupon operative to constrict said passage means whereby a liquid pressure is developed in said annular chamber and acts on said annular valve element to shift same to close said low pressure port and to open said high pressure port, a second flow-sensitive valve disposed in said passage means and responsive to liquid flow into said annular chamber at and above a rate corresponding to outward movement of the piston in the cylinder controlled by a vehicle wheel moving at and above a defined upper critical speed, said second flow-sensitive valve being thereupon operative to constrict said passage means whereby a liquid pressure is developed inwardly of said hollow stem and acts on said annular valve element to shift same to close said high pressure port and to open said low pressure port.

5. Mechanism according to claim 2, wherein the lost-motion device includes a hollow stem shiftable with the piston, and formed with axially spaced cylindrical steps, and the valve means includes an element of annular form closely fitting the respective steps of the hollow stem, whereby the hollow stem and the annular valve element are cooperably slidable towards each end of the inward and outward reciprocating strokes of the piston, and the stem is formed with a recess between its cylindrical steps which provides a liquid flow passage by-passing said valve means during the intermediate portion of each stroke of the piston.

6. A combined retarder and accelerator mechanism for railway vehicles which run free along a track, to retard such a vehicle running at speeds above a defined upper critical speed, to accelerate such a vehicle running at a speed below a defined relatively lower critical speed, and to have a neutral effect on such a vehicle running at speeds intermediate such critical speeds, said mechanism comprising a piston and cylinder unit enclosing a volume of liquid, means located for depression through a predetermined distance by the wheel flange of a passing vehicle, said depressible means being operatively connected to said piston and cylinder unit to contract the same through a corresponding distance when depressed, a low pressure valve port and an axially spaced high pressure valve port, adapted for connection with sources of low and high pressure liquid respectively, and admitting to the interior of said piston and cylinder unit, to extend the same after contraction, a ported, sliding sleeve valve shiftable axially within the cylinder into alternative communication with the low pressure and high pressure ports, a valve-controlling device including a stem shiftable axially with the depressible means, for movement conjointly with the depressible member of the piston and cylinder unit, additional valve-controlling devices responsive to rates of movement of said depressible member which correspond to movement of the vehicle at or above said upper critical speed and at or below said lower critical speeds respectively, the several valve-controlling devices being operatively coordinated and adapted to shift said sleeve valve into position to effect registry of its port with the high pressure port during contraction of the piston and cylinder unit by a vehicle wheel moving faster than the upper critical speed, and to effect registry of its port with the low pressure port during extension, for retardation, and into registry with the low pressure port during contraction, and into registry with the high pressure port during extension of the piston and cylinder unit, against a vehicle wheel moving slower than said lower critical speed, for acceleration, and to effect registry of its port with the high pressure port during both contraction and extension when the speed of the vehicle wheel is intermediate the upper and lower critical speeds, for neutral effect.

7. A mechanism as in claim 6, including means interengageable between the sleeve valve and the stem to insure shifting of the sleeve valve positively from registry with either of the low pressure or the high pressure ports and into registry with the other such port, during terminal contractive and expansive movement of the piston and cylinder unit.

References Cited in the file of this patent
UNITED STATES PATENTS

| | | |
|---|---|---|
| 1,690,695 | Norton | Nov. 6, 1928 |
| 3,040,676 | Checkley et al. | June 26, 1962 |